United States Patent Office 2,865,589
Patented Dec. 23, 1958

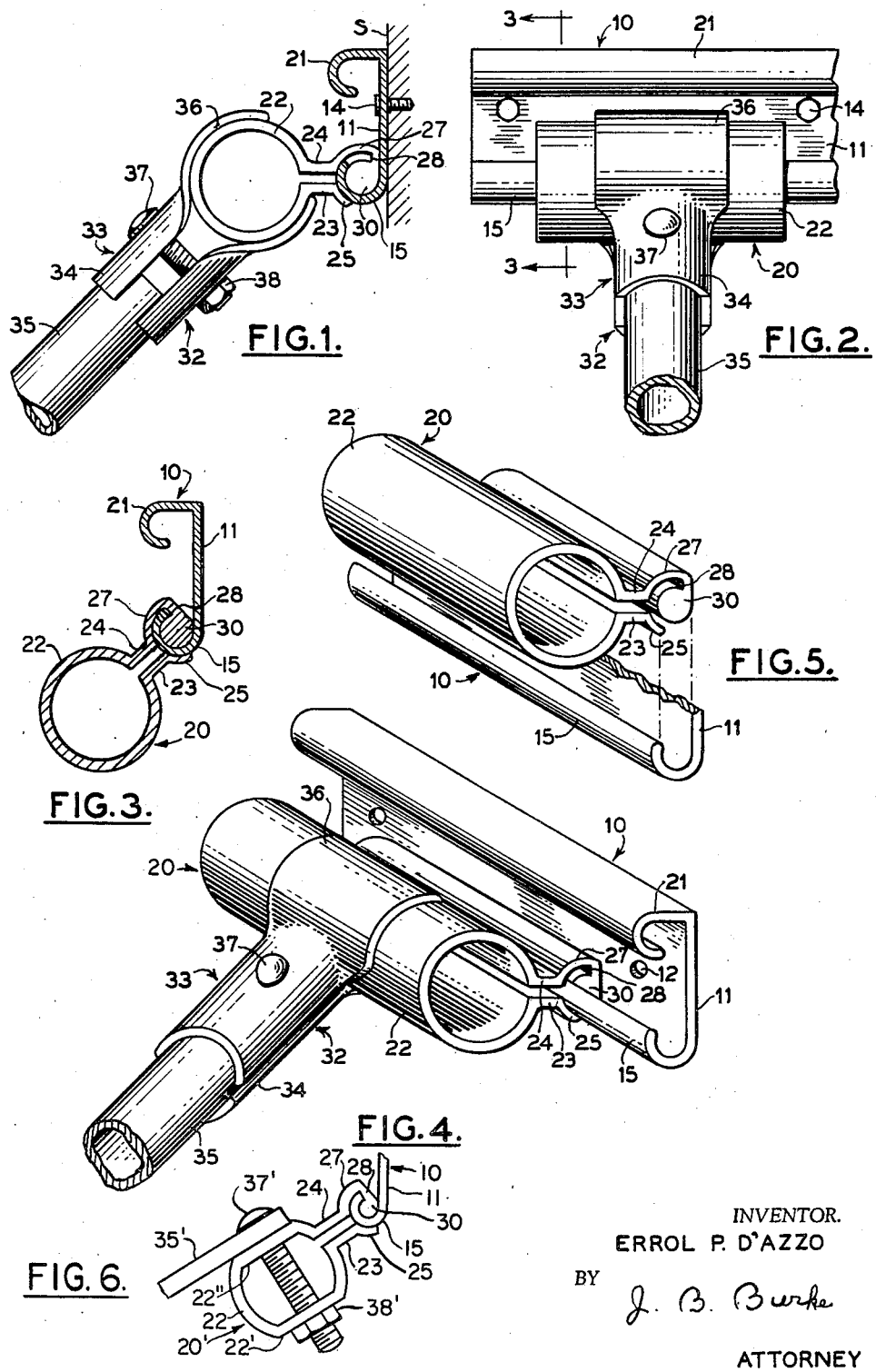

2,865,589

AWNING RAFTER SUPPORT

Errol P. D'Azzo, Brooklyn, N. Y.

Application July 5, 1957, Serial No. 670,139

15 Claims. (Cl. 248—284)

This invention relates to the art of awning supports and particularly concerns a support adapted for lateral and angular adjustment of awning rafters thereon.

The invention is characterized by a molding which is secured to a vertical support such as a building wall, and an adapter which clamps to the molding. A single nut and bolt serves to secure a rafter to the adapter and to clamp the adapter to the molding at the desired location and angle. The adapter is so formed that it can be adjusted in position in a vertical plane through a range of about forty-five degrees before being fixed in the selected position. Only a single nut is required to be tightened to effect the rigid connection of the rafter to its support. This accomplishes a considerable saving in labor during installation of an awning. The support provided according to the invention is strong, secure, and relatively inexpensive to manufacture since its principal components can be extruded or otherwise formed by mass production manufacturing methods.

It is therefore a principal object of the invention to provide an awning rafter support including a suitable molding and adapter member.

It is a further object to provide an awning rafter support including a molding having a curved ledge and an adapter member adjustably positionable on the ledge, the adapter member being securable to the ledge by a single nut and bolt which also connects the rafter to the support.

It is a further object to provide an awning structure including a molding having a curved ledge, an angularly positionable adapter clamp member mounted on the ledge, a rafter bar and a nut and a bolt securing the bar to the adapter clamp member and the adapter clamp member to the molding.

Other and further objects and advantages of the invention will become apparent from the following description taken together with the drawing, wherein:

Fig. 1 is a side elevational view of an assembly according to the invention. Fig. 2 is a front elevational view of the assembly. Fig. 3 is a sectional view taken on lines 3—3 of Fig. 2, showing the adapter in a preferred position on the molding. Fig. 4 is a perspective view of the assembly. Fig. 5 is an exploded perspective view of the molding and adapter clamp. Fig. 6 is an end view of a modification of the invention.

Referring to Figs. 1–5 of the drawing, there is shown a molding 10 which may have a length ranging from a few inches to twenty or more feet. The molding includes a straight flat wall 11 in which are provided spaced holes 12 for attaching the molding to a vertical support S by suitable means such as bolts 14 shown in Figs. 1 and 2. At its lower edge the molding has a curved ledge 15 which is turned upwardly to support the adapter clamp member 20. The upper edge 21 of the molding may be formed to support an awning head rod by suitable means unrelated to the present invention.

The adapter clamp member has a split cylindrical portion 22 formed with radially outward extending neck sections 23 and 24. The lengths of the neck sections are coextensive with the axial length of section 22. Neck 23 terminates in a downwardly turned flange 25 having an arcuate cross section and shaped interiorly to engage the exterior of the curved flange 15. Neck section 24 has an upwardly turned flange 27 also arc-like in cross section and having an interior curvature corresponding to the exterior curvature of ledge 15. Since the interior curvature of both flanges 25 and 27 corresponds to the external curvature of ledge 15, the adapter clamp member 20 is angularly adjustable from the position shown in Fig. 1 to the position shown in Fig. 3. This is a range of adjustability of about forty-five degrees. Flange 27 merges into a depending straight wall section 28 which terminates a rod-like or tubular formation 30. The section 30 is generally cylindrical in form and corresponds in curvatures to the internal curvature of ledge 15. The radius of curvature of section 30 is thus less than the internal radius of curvature of flanges 25, 27. The ledge 15 is cylindrically curved and extends angularly from molding section 11 slightly more than 180°. The free end of the ledge 15 is engaged between cylindrical section 30 and the inner end of section 23 when the adapter member is in its uppermost position as shown in Fig. 4. When the member 20 is turned to its lowermost position as shown in Fig. 3 the free end of ledge 15 is abutted against the inner side of wall section 28. In all positions of member 20 on molding 10 flanges 25 and 27 are in contact with the exterior of ledge 15 with ledge 15 disposed or clamped between flanges 25, 27 and cylindrical section 30. The combined angular extent of the inner sides of flanges 25, 27 exceeds 45° arc and is preferably about 90° arc.

In order to accomplish this clamping action, two pipe clamp members 32 and 33 may be employed. Each clamp member has a curved section 34 which is engaged on the exterior of the curved rafter 35. The clamp members further include other curved sections 36 having their axis of curvature disposed perpendicular to the axis of curvature of sections 34. The inner curved surfaces of sections 36 are in contact with the cylindrical exterior surface of section 22. A bolt 37 and nut 38 serve to hold the clamping members securely attached to rafter 35 and to section 22. The bolt passes through apertures in sections 34 of the clamping members just beyond the inner end of rafter 35.

It will be noted that the tightening of nut 38 secures the clamping members 32, 33 to the rafter 35 and section 22 and in addition effectively clamps the ledge 15 between flanges 25, 27 and section 30.

Adapter clamp member 20 is formed of flexible metal so that it can easily be sprung on ledge 15 and secured thereon. Alternatively the member 20 can be slid onto the ledge 15 from the end of the molding.

All parts of the assembly shown in the drawing can be made from extruded, stamped, or rolled metal plates or sheets. Thus there is provided a rafter support assembly which can be fabricated at minimum cost and at the same time it can be installed with a minimum of labor.

To install the assembly the molding will first be attached to a vertical support S by bolts 14. The adapter clamp member will be then mounted on the molding. If desired the member 20 can be mounted on the molding before the molding is secured to the vertical building wall or other support S. The rafter is then inserted between the clamping members 32, 33 which then engage on section 22. Nut 38 will be in a loosened condition. After section 20 is rotated to a desired angular position and is set to a desired location along the length of molding 10 the nut 38 may be fully tightened.

If desired the exterior surface of cylindrical section 22 may be roughened or scored to increase the frictional grip of the clamping members thereon. The inner and outer sides of the ledge 15 and the inner sides of flanges 25, 27 may similarly be roughened.

In Fig. 6 is shown a modification of the invention in which the adapter clamp member 20' has cylindrical portion 22 formed with flattened opposing sides or walls 22' and 22''. Aligned holes are provided in walls 22', 22'' through which holes passes the bolt 37'. Nut 38' is threaded on the bolt at wall 22'. The rafter may have the form of a flat bar 35' which has an aperture through which the bolt passes so that the rafter is secured between the head of the bolt and wall 22'' when the nut is tightened. At the same time the tightening of the nut causes the clamping action by which the flanges 25 and 27 are secured to the curved ledge 15. The free edge of the ledge 15 is shown abutting wall section 28 of the adapter which is the most stable position of the adapter on the molding 10. If desired the clamping members 32 and 33 may be mounted on adapter 20' instead of flat bar 35' to support a cylindrical rafter. The single nut 38 and bolt 37 will be used to attach the rafter to the adapter clamp member 20' and to attach the adapter clamp member to the molding.

What is claimed and sought to be protected by Letters Patent of the United States is:

1. A rafter support comprising a molding having a flat section, said section having a turned curved ledge extending angularly through at least 180° of arc from the flat section, and an adapter clamp member disposed on said ledge, said member having a split cylindrical section with two straight extensions, said extensions having curved flanges formed thereon respectively, one of said flanges having a depending wall portion terminating in an enlarged cylindrical portion having an external portion corresponding to the internal curvature of said ledge and the inner sides of the flanges having a curvature corresponding to the external curvature of said ledge, the angular extent of the inner sides of said flanges being greater than forty-five degrees.

2. A rafter support comprising an adapter clamp member having a split cylindrical section with two straight extensions, said extensions having curved flanges formed thereon respectively, one of said flanges having a depending wall portion terminating in an enlarged cylindrical portion, the inner sides of the flanges having a cylindrical curvature with a radius of curvature greater than the radius of curvature of said cylindrical portion.

3. A rafter support comprising a molding having a flat section, said section having a turned curved ledge extending from the flat section, and an adapter clamp member disposed on said ledge, said member having a split cylindrical section with two extensions, said extensions having curved flanges formed thereon respectively, one of said flanges terminating in an enlarged cylindrical portion, the external curvature of the cylindrical portion corresponding to the internal curvature of said ledge and the inner sides of the flanges having a curvature corresponding to the external curvature of said ledge.

4. A rafter support comprising an adapter clamp member having a split cylindrical section with two extensions, said extensions having curved flanges formed thereon respectively, one of said flanges terminating in an enlarged cylindrical portion, the inner sides of the flanges having a cylindrical curvature with a radius of curvature greater than the radius of curvature of said cylindrical portion.

5. An awning assembly comprising a molding having a flat section, said section having a turned curved ledge, an adapter clamp member mounted on said ledge, said member having a split cylindrical section with two extensions and at least one flat side, said extensions having curved flanges formed thereon, one of said flanges terminating in cylindrical portion, said cylindrical portion being lodged in the inner side of said ledge, said flanges having their curved inner sides contacting the outer side of said ledge, a flat rafter contacting said flat side, a nut and a bolt, said bolt passing through aligned apertures in the rafter and cylindrical section, said nut being threaded on the bolt and being effective to clamp said adapter clamp member to the ledge of the molding.

6. A rafter support comprising a molding having a turned curved ledge extending angularly through at least 180° of arc and an adapter clamp member disposed on said ledge, said member having a split cylindrical section with two extensions, said extensions having curved flanges formed thereon respectively, one of said flanges terminating in a cylindrical portion, said cylindrical portion being disposed inside the ledge with the inner sides of the flanges contacting said ledge.

7. A rafter support comprising an adapter clamp member formed of flexible material and having a split cylindrical section with two extensions, said extensions having curved flanges formed thereon, one of said flanges terminating in cylindrical portion, the inner sides of the flanges having a cylindrical curvature, said cylindrical portion being disposed parallel to the inner sides of said flanges.

8. An awning assembly comprising a molding having a flat section, said section having a turned curved ledge, an adapter clamp member formed of flexible material and mounted on said ledges, said member having a split cylindrical section with two extensions, said extensions having curved flanges formed thereon, one of said flanges having a depending wall portion terminating in an enlarged cylindrical portion, said cylindrical portion being lodged in the inner side of said ledge, said flanges having their curved inner sides extending angularly more than fifty-five degrees and contacting the outer side of said ledge, a rafter, a bolt passing through said rafter and cylindrical section, and a nut threaded on said bolt.

9. A rafter support comprising an elongated molding having a turned curved ledge 180° of arc, and an adapter clamp member formed of flexible material and disposed on said ledge, said member having a split cylindrical section with two straight extensions, said extensions having curved flanges formed thereon respectively, one of said flanges having a depending wall portion terminating in an enlarged cylindrical portion having an external curvature corresponding to the internal curvature of said ledge and the inner sides of the flanges having a curvature corresponding to the external curvature of said ledge, the angular extent of the inner sides of said flanges being about ninety degrees of arc so that said member is angularly positionable on said ledge.

10. An awning assembly comprising a molding having a flat section, said section having a turned curved ledge, an adapter clamp member mounted on said ledge, said member having a split cylindrical section with two extensions, said extensions having curved flanges formed thereon, one of said flanges having a depending wall portion terminating in an enlarged cylindrical portion, said cylindrical portion being lodged in the inner side of said ledge, said flanges having their curved inner sides contacting the outer side of said ledge, a cylindrical rafter, a pair of clamping members, each of said clamping members having a first curved section engaged on one end of the rafter and another curved section engaged on the cylindrical section of said adapter clamp member, a bolt passing through said curved sections of the clamping members, and a nut threaded on said bolt.

11. An awning assembly comprising a molding having a flat section, said section having a turned curved ledge, an adapter clamp member mounted on said ledge, said member having a split cylindrical section with two extensions, said extensions having curved flanges formed thereon, one of said flanges terminating in cylindrical portion, said cylindrical portion being lodged in the inner side of said ledge, said flanges having their curved inner sides contacting the outer side of said ledge, a cylindrical rafter, and a pair of clamping members, each of said clamping members having a first curved section engaged on one end of the rafter and another curved section engaged on the cylindrical section of said adapter clamp member.

12. A rafter support comprising an adapter clamp member formed of flexible material and having a split cylindrical section with two extensions, said extensions having curved flanges formed thereon, one of said flanges terminating in cylindrical portion, the inner sides of the flanges having a cylindrical curvature, said cylindrical portion being disposed parallel to the inner sides of said flanges, said cylindrical section having at least one flat side having a first hole therein, said section having another hole diametrically aligned with the first hole.

13. An awning assembly comprising a molding having a flat section, said section having a turned curved ledge, an adapter clamp member formed of flexible material and mounted on said ledges, said member having a split cylindrical section with two extensions, said extensions having curved flanges formed thereon, one of said flanges having a depending wall portion terminating in an enlarged cylindrical portion, said cylindrical portion being lodged in the inner side of said ledge, said flanges having their curved inner sides extending angularly more than fifty-five degrees and contacting the outer side of said ledge, a cylindrical rafter, a pair of clamping members, each of said clamping members having a first curved section engaged on one end of the rafter and another curved section disposed transversely to the first curved section and engaged on the cylindrical section of said adapter clamp member, a bolt passing through said curved sections of the clamping members, and a nut threaded on said bolt.

14. A rafter support comprising an elongated molding having a turned curved ledge 180° of arc, and an adapter clamp member formed of flexible material and disposed on said ledge, said member having a split substantially cylindrical section with two straight extensions, said extensions having curved flanges formed thereon respectively, one of said flanges having a depending wall portion terminating in an enlarged cylindrical portion having an external curvature corresponding to the internal curvature of said ledge and the inner sides of the flanges having a curvature corresponding to the external curvature of said ledge, the angular extent of the inner sides of said flanges being about ninety degrees of arc so that said member is angularly positionable on said ledge, said section further having two parallel flat sides with aligned apertures therein.

15. A rafter support comprising a molding having a flat section, said section having a turned curved ledge extending from the flat section, and an adapter clamp member disposed on said ledge, said member having a split cylindrical section with two extensions and two flat parallel sides, said extensions having curved flanges formed thereon respectively, one of said flanges terminating in an enlarged cylindrical portion, the external curvature of the cylindrical portion corresponding to the internal curvature of said ledge and the inner sides of the flanges having a curvature corresponding to the external curvature of said ledge, said flat parallel sides having two aligned apertures located therein respectively.

References Cited in the file of this patent

UNITED STATES PATENTS

| | | |
|---|---|---|
| 2,565,200 | Burress | Aug. 21, 1951 |
| 2,658,233 | Kimmel | Nov. 10, 1953 |
| 2,752,992 | D'Azzo | July 3, 1956 |
| 2,799,464 | D'Azzo | July 16, 1957 |